UNITED STATES PATENT OFFICE.

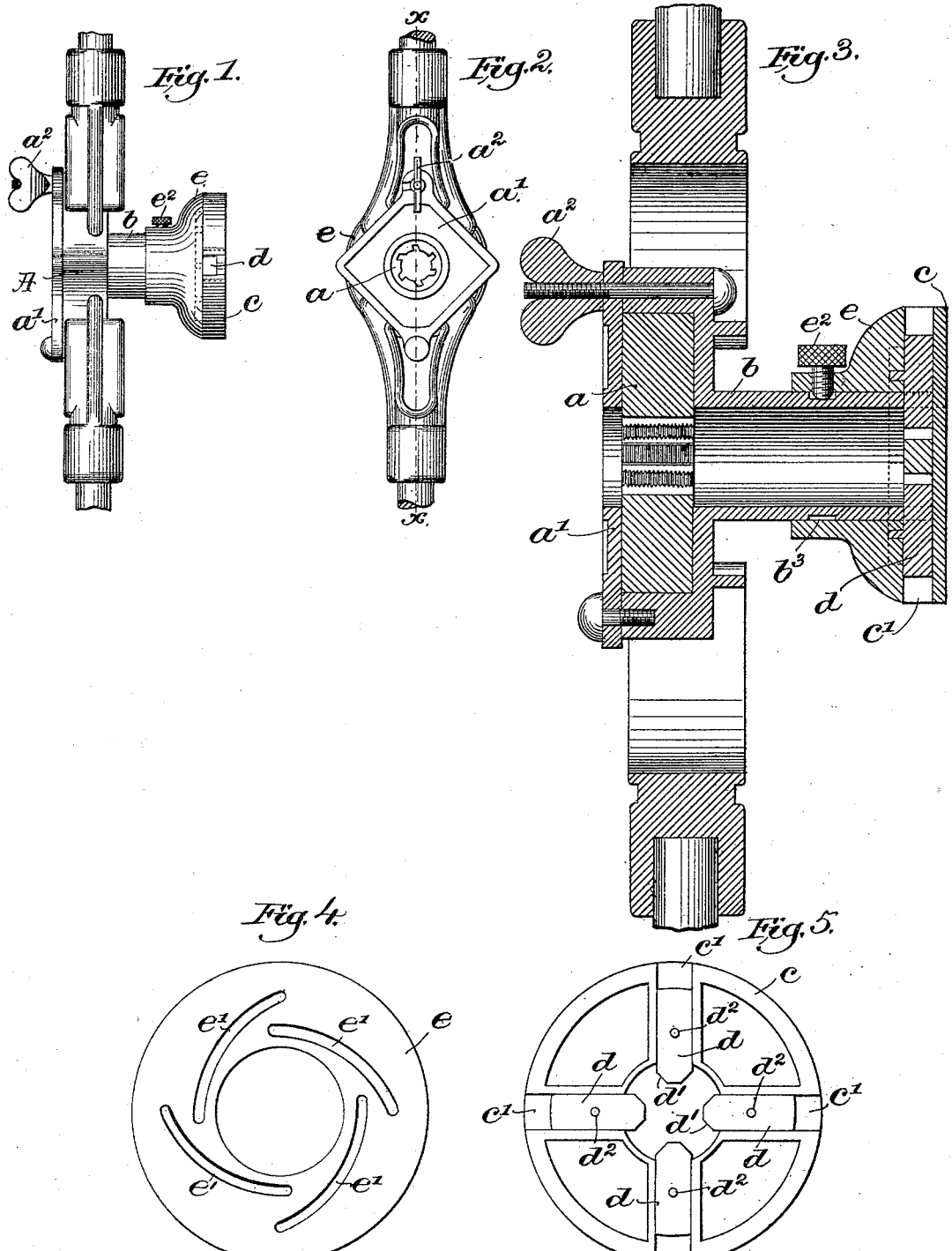

BERNARD THAYER, OF BOSTON, MASSACHUSETTS, ASSIGNOR OF ONE-HALF TO CHARLES H. STUART, OF SAME PLACE.

DIE-STOCK.

SPECIFICATION forming part of Letters Patent No. 491,453, dated February 7, 1893.

Application filed March 8, 1892. Serial No. 424,123. (No model.)

*To all whom it may concern:*

Be it known that I, BERNARD THAYER, of Boston, county of Suffolk, State of Massachusetts, have invented an Improvement in Die-Stocks, of which the following description, in connection with the accompanying drawings, is a specification, like letters on the drawings representing like parts.

This invention relates to die-stocks, and has for its object to improve the same in a manner calculated to facilitate the change in adjustment required for work of various sizes.

Die-stocks as at present constructed are provided at one side with a guide or bushing which runs upon the pipe or rod upon which the thread is being cut to serve as a guide for the die-stock as the latter is rotated. These guides or bushings must fit the rod or pipe being threaded in order to properly guide the die-stock as it is rotated so that a true thread will be cut, a change in bushing being necessary whenever the die-stock is used upon a pipe or rod of a different diameter or size, thus requiring constantly a large stock of bushing of various sizes to fit the many sizes of pipe or rod upon which threads have to be cut.

In accordance with this invention the die-stock is provided with a permanent guide or support of a diameter to receive the smallest or largest pipe or rod upon which the die-stock is capable of being used, said support at its outer end carrying a series of adjustable jaws which may be moved toward and from the center of the guide by suitable means to accommodate and fit any diameter of rod or pipe.

One part of this invention therefore consists in a die-stock provided with a long guide or support extended from its rear side, and a series of adjustable jaws carried by said guide at its outer end, and adjusting devices therefor intermediate said jaws and die stock, substantially as will be described.

Other features of this invention will be hereinafter described, and pointed out in the claim at the end of this specification.

The drawings Figure 1, represents in side elevation the body portion of a die-stock embodying this invention. Fig. 2, a face view of the same. Fig. 3, an enlarged section on the dotted line $x$—$x$, Fig. 2. Figs. 4 and 5 details to be referred to.

Referring to the drawings, A represents a die-stock which may be of usual or desired construction, it being herein represented as provided with a recess to receive the die $a$, held in position by the hinged plate $a'$ and clamping screw $a^2$.

In accordance with this invention, the die-stock A upon its rear side is provided with a preferably, tubular guide or support $b$ in line with the cutting portion of the die, said guide at its outer end carrying the fixed head $c$ provided with a series of guide-ways $c'$, herein shown as four in number, to receive the radially-adjustable jaws $d$ preferably having their inner ends beveled as at $d'$ to permit the jaws to be moved closer together to accommodate the smallest possible diameter of rod or pipe. The adjustable jaws $d$ are provided with pins or studs $d^2$ which enter suitable cam grooves $e'$ in the rotatable cam head $e$ mounted loosely upon the guide $b$ and provided with a clamping screw $e^2$, which preferably runs in a groove $b^3$ cut in the surface of the guide to thereby keep the cam head up to the fixed head $c'$, said clamping screw when turned acting as a clamp to hold the cam head in adjusted position.

In operation the clamping screw $e^2$ when loosened, permits the cam head $e$ to be rotated in one or the other direction so that it its cam grooves $e'$ will act upon the pins $d^2$ on the adjustable jaws $d$ to move the latter toward or from the common center to accommodate pipes or rods of varying sizes.

I claim—

A die-stock having a long tubular guide or support $b$ extended from its rear side and annularly grooved at $b^3$, an enlarged head fixed to the extremity of the guide and having radial guide-ways upon its inner face, and adjustable jaws movable therein, combined with an independent cam-head rotatable on said guide intermediate the die-stock and jaws and abutting against the latter, cam-surfaces to act upon the jaws and move them, and a clamping screw carried by the cam-head and entering the annular groove to serve as a retaining and clamping device for said cam-head, substantially as described.

In testimony whereof I have signed my name to this specification in the presence of two subscribing witnesses.

BERNARD THAYER.

Witnesses:
FREDERICK L. EMERY,
FRANCES M. NOBLE.